United States Patent
Kobayashi (10) Patent No.: US 8,648,590 B2
(45) Date of Patent: Feb. 11, 2014

(54) INDUCTION DETECTING TYPE ROTARY ENCODER

(75) Inventor: Hirokazu Kobayashi, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 1001 days.

(21) Appl. No.: 12/722,059

(22) Filed: Mar. 11, 2010

(65) Prior Publication Data

US 2010/0231206 A1    Sep. 16, 2010

(30) Foreign Application Priority Data

Mar. 11, 2009   (JP) .................................. 2009-057761

(51) Int. Cl.
*G01B 7/30*    (2006.01)
(52) U.S. Cl.
USPC ................. 324/207.25; 324/206; 324/207.11; 324/207.15; 324/256
(58) Field of Classification Search
USPC ................ 324/206, 207.11, 207.15, 207.25, 324/207.13, 256, 257, 259, 260
See application file for complete search history.

(56) References Cited

U.S. PATENT DOCUMENTS

| | | | | |
|---|---|---|---|---|
| 7,508,197 | B1 * | 3/2009 | Rakov et al. | 324/207.25 |
| 2004/0032255 | A1 * | 2/2004 | Berndt | 324/207.25 |
| 2004/0251895 | A1 * | 12/2004 | Eidenvall et al. | 324/207.15 |
| 2005/0225320 | A1 * | 10/2005 | Lee | 324/207.17 |
| 2007/0132448 | A1 * | 6/2007 | Kimura | 324/207.25 |

FOREIGN PATENT DOCUMENTS

JP    A-2006-322927    11/2006

* cited by examiner

*Primary Examiner* — Jermele M Hollington
*Assistant Examiner* — Temilade S Rhodes-Vivour
(74) *Attorney, Agent, or Firm* — Oliff PLC (57) ABSTRACT

An induction detecting type rotary encoder includes: a stator; a rotor configured to be rotated with respect to a rotary shaft; a first transmitting coil; a second transmitting coil; a first receiving coil; a second receiving coil; a first magnetic flux coupling body; and a second magnetic flux coupling body. The first transmitting coil is disposed between the first and second receiving coils. A distance between the second transmitting coil and the rotary shaft is larger than that of the second receiving coil and the rotary shaft. The first magnetic flux coupling body forms a first track for causing a periodic change for each rotation. The second magnetic flux coupling body forms a second track for causing a periodic change for each rotation. The second magnetic flux coupling body has a pattern of which an inner peripheral side is substantially continuous in a circumferential direction.

8 Claims, 8 Drawing Sheets

INDUCTION DETECTING TYPE ROTARY ENCODER

CROSS-REFERENCE TO RELATED APPLICATIONS

This application is based upon and claims the benefit of priority from Japanese Patent Application No. 2009-057761, filed Mar. 11, 2009, the entire contents of which are incorporated herein by reference.

BACKGROUND

1. Field of the Invention

The present invention relates to an induction detecting type rotary encoder which measures a rotary angle of an object by using magnetic flux coupling between wirings provided in a rotor and a stator.

2. Description of the Related Art

A rotary encoder includes a stator which is provided with a transmitting coil and a receiving coil and a rotor which is provided with a magnetic flux coupling coil for causing magnetic flux coupling with the transmitting and receiving coils. In the case where a rotary encoder is applied to a hand tool such as a micrometer, a decrease in size thereof needs to be realized by integrating plural tracks (the transmitting coil, the receiving coil, and the magnetic flux coupling coil) for generating signals having different wavelengths.

For example, a rotary encoder disclosed in JP-A-2006-322927 includes first and second transmitting coils which are sequentially provided from the inside so as to be concentric about a rotary shaft and first and second receiving coils which are sequentially provided from the inside so as to correspond to the first and second transmitting coils and to be concentric about the rotary shaft. In addition, the rotary encoder disclosed in JP-A-2006-322927 includes first and second magnetic flux coupling bodies which are formed so as to be concentric about the rotary shaft and cause magnetic flux coupling with the first and second receiving coils.

In order to further improve precision, it is desirable to have a configuration in which crosstalk between adjacent tracks is maximally suppressed.

SUMMARY

An object of the invention is to provide a highly precise induction detecting type rotary encoder capable of preventing a cross-talk between adjacent tracks.

According to an aspect of the invention, there is disposed an induction detecting type rotary encoder including: a stator; a rotor configured to be rotated with respect to a rotary shaft, the rotor being disposed while facing the stator; a first transmitting coil disposed on a first surface of the stator, the first surface facing the rotor; a second transmitting coil disposed on the first surface so as to surround the first transmitting coil, the second transmitting coil being arranged in a concentric pattern with the first transmitting coil with respect to the rotary shaft; a first receiving coil disposed on the first surface; a second receiving coil disposed on the first surface so as to surround the first receiving coil, the second receiving coil being arranged in a concentric pattern with the first receiving coil with respect to the rotary shaft; a first magnetic flux coupling body disposed on the second surface of the rotor, the second surface facing the stator, the first magnetic flux coupling body magnetically coupling with the first receiving coil; and a second magnetic flux coupling body disposed on the second surface so as to surround the first magnetic flux coupling body, the second magnetic flux coupling body being arranged in a concentric pattern with the first magnetic flux coupling body with respect to the rotary shaft, the second magnetic flux coupling body magnetically coupling with the second receiving coil, wherein: the first transmitting coil is disposed between the first receiving coil and the second receiving coil; a distance between the second transmitting coil and the rotary shaft is larger than a distance between the second receiving coil and the rotary shaft; the first magnetic flux coupling body forms a first track for causing a periodic change for each rotation; the second magnetic flux coupling body forms a second track for causing a periodic change for each rotation; and the second magnetic flux coupling body has a pattern of which an inner peripheral side is substantially continuous in a circumferential direction.

According to another aspect of the invention, there is disposed an induction detecting type rotary encoder including: a stator; a rotor configured to be rotated with respect to a rotary shaft, the rotor being disposed while facing the stator; a first transmitting coil disposed on a first surface of the stator, the first surface facing the rotor; a second transmitting coil disposed on the first surface so as to surround the first transmitting coil, the second transmitting coil being arranged in a concentric pattern with the first transmitting coil with respect to the rotary shaft; a first receiving coil disposed on the first surface; a second receiving coil disposed on the first surface so as to surround the first receiving coil, the second receiving coil being arranged in a concentric pattern with the first receiving coil with respect to the rotary shaft; a first magnetic flux coupling body disposed on the second surface of the rotor, the second surface facing the stator, the first magnetic flux coupling body magnetically coupling with the first receiving coil; and a second magnetic flux coupling body disposed on the second surface so as to surround the first magnetic flux coupling body, the second magnetic flux coupling body being arranged in a concentric pattern with the first magnetic flux coupling body with respect to the rotary shaft, the second magnetic flux coupling body magnetically coupling with the second receiving coil, wherein: a distance between the first receiving coil and the rotary shaft is larger than a distance between the first transmitting coil and the rotary shaft; the second transmitting coil is disposed between the first receiving coil and second receiving coil; the first magnetic flux coupling body forms a first track for causing a periodic change for each rotation; the second magnetic flux coupling body forms a second track for causing a periodic change for each rotation; and the first magnetic flux coupling body has a pattern of which an outer peripheral side is substantially continuous in a circumferential direction.

According to the above, it is also possible to provide a highly precise induction detecting type rotary encoder capable of preventing a cross-talk between adjacent tracks.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Exemplary embodiments of the invention will be described in detail with reference to the drawings.

Figure 1:
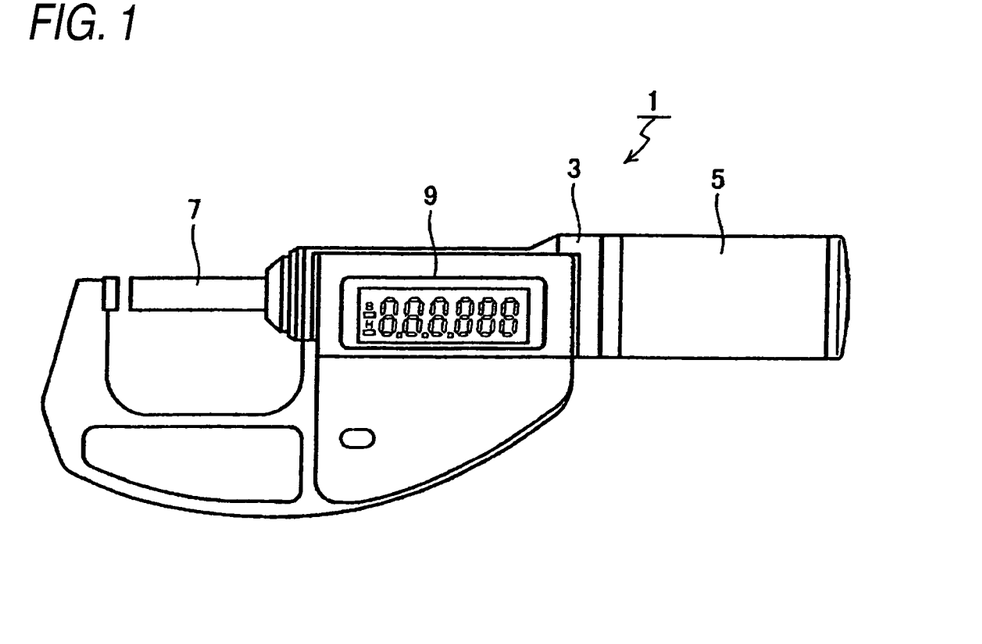
FIG. 1 is a front view of a digital micrometer 1 mounted with an induction detecting type rotary encoder according to embodiments of the invention.

By referring to FIG. 1, a configuration of a digital micrometer 1 mounted with an induction detecting type rotary encoder according to a first embodiment of the invention will be described. FIG. 1 is a front view of the digital micrometer 1. A thimble 5 is rotatably attached to a frame 3 of the digital micrometer 1. A spindle 7 as a gauge head is rotatably supported to the inside of the frame 3.

One end of the spindle 7 is exposed to the outside, and the one end is used to be brought into contact with an object. On the other hand, a feeding screw (not shown in FIG. 1) is formed in the other end of the spindle 7 by cutting. The feeding screw is fitted into a nut inside the thimble 5.

In this configuration, when the thimble 5 is rotated in a normal direction, the spindle 7 moves forward along the axial direction of the spindle 7, and when the thimble 5 is rotated in a reverse direction, the spindle 7 moves backward along the axial direction of the spindle 7. The frame 3 is provided with a liquid crystal display portion 9 which is able to display a measurement value of the digital micrometer 1 thereon.

Figure 2:
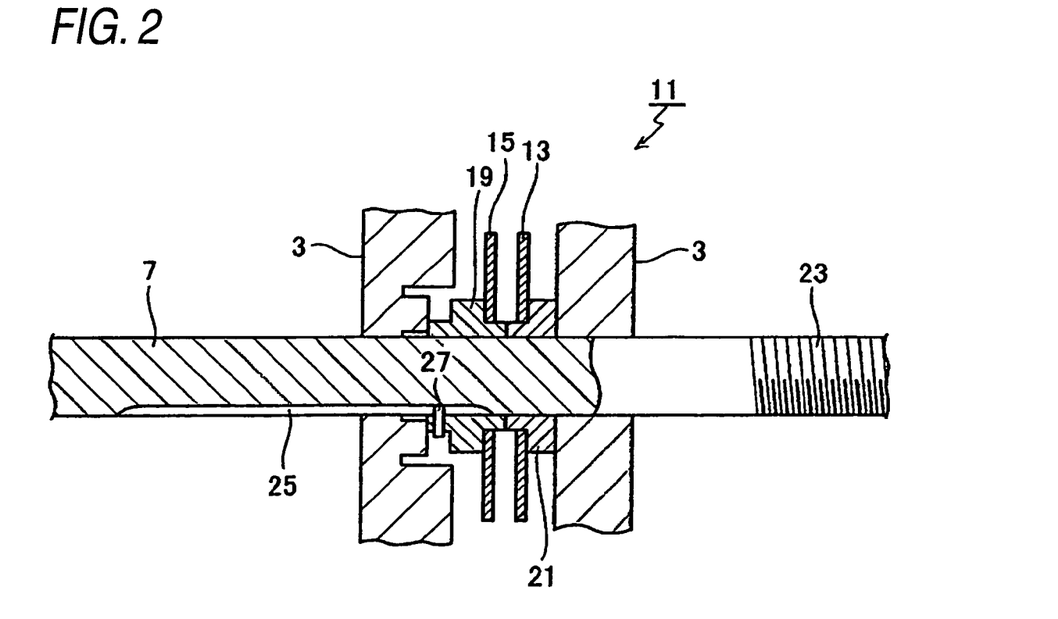
FIG. 2 is a sectional view of an induction detecting type rotary encoder 11 according to the embodiments of the invention assembled to the micrometer 1 of FIG. 1.

Next, by referring to FIG. 2, a configuration of the induction detecting type rotary encoder 11 according to the first embodiment assembled to the digital micrometer 1 of FIG. 1 will be described. FIG. 2 is a sectional view of the induction detecting type rotary encoder 11.

The induction detecting type rotary encoder 11 includes a stator 13 and a rotor 15 which is rotatable about the spindle (rotary shaft) 7 and is disposed to face the stator 13. The rotor 15 is fixed to an end surface of a cylindrical rotor bush 19. The spindle 7 is inserted into the rotor bush 19. The stator bush 21 is fixed to the frame 3.

The surface of the spindle 7 is provided with a feeding screw 23 which is fitted into a nut disposed inside the thimble 5 of FIG. 1. In addition, a key groove 25 is grooved in the surface of the spindle 7 along the longitudinal direction (that is, the reciprocating direction of the spindle 7) of the spindle 7. A front end of a pin 27 fixed to the rotor bush 19 is inserted into the key groove 25. When the spindle 7 rotates, a rotation force thereof is transmitted to the rotor bush 19 through the pin 27, so that the rotor 15 is rotated. In other words, the rotor 15 is rotated in association with the rotation of the spindle 7. Since the pin 27 is not fixed to the key groove 25, the rotor 15 can be rotated without moving the rotor 15 together with the spindle 7.

Figure 3:
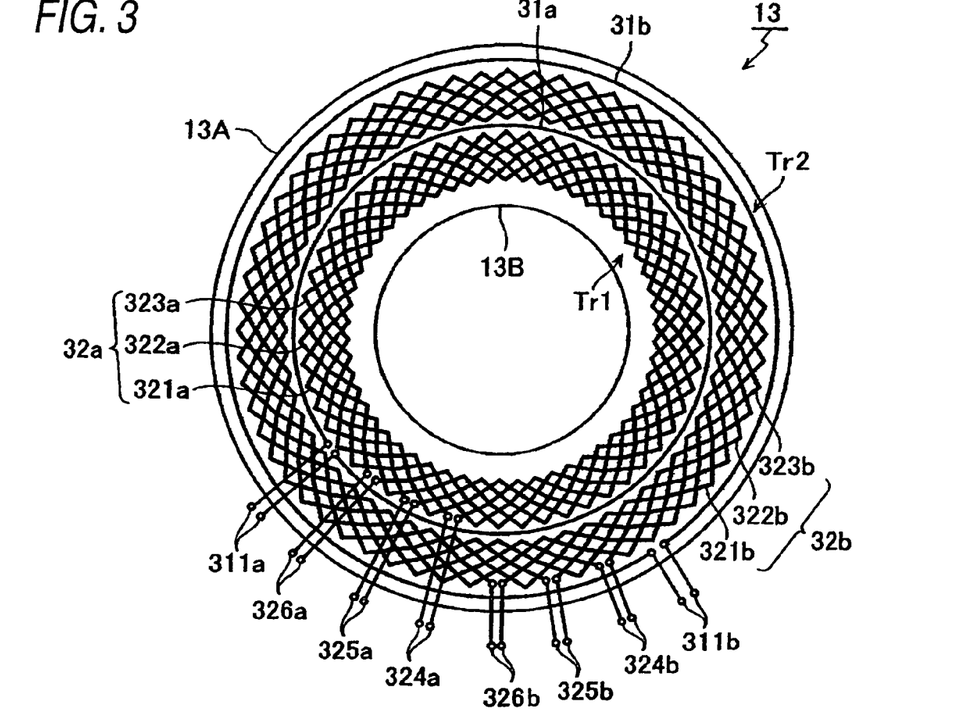
FIG. 3 is a diagram illustrating a configuration on a stator 13.
Figure 4:
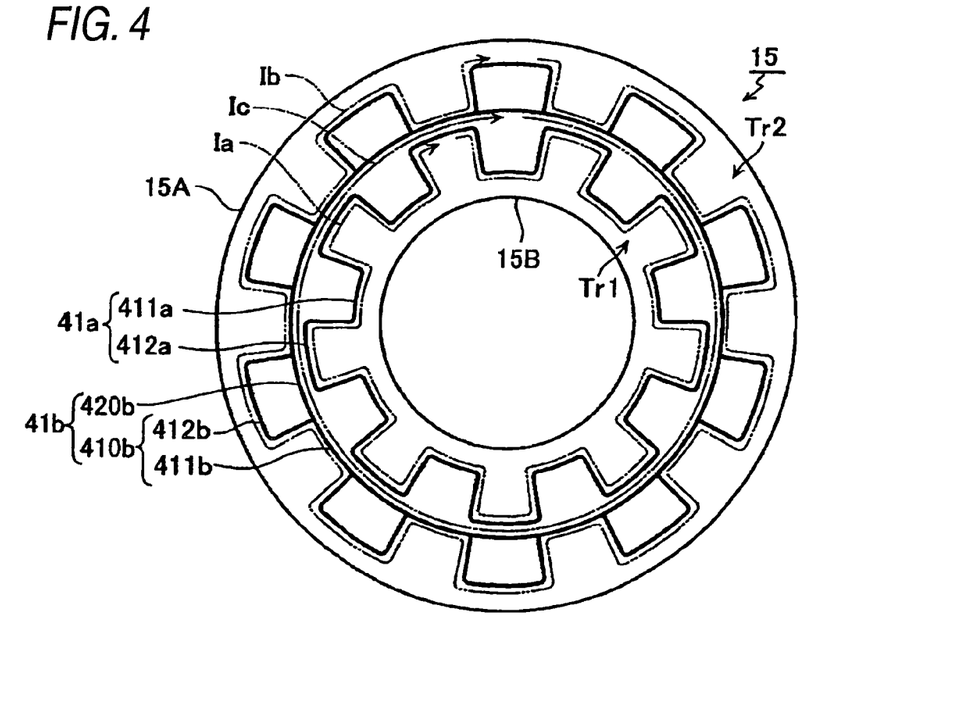
FIG. 4 is a diagram illustrating a configuration on a rotor 15.

Next, by referring to FIGS. 3 and 4, a configuration on the stator 13 and the rotor 15 will be described. FIG. 3 is a diagram illustrating a configuration on the stator 13. FIG. 4 is a diagram illustrating a configuration on the rotor 15. Each of the stator 13 and the rotor 15 are provided with two tracks Tr1 and Tr2 which have different measurement precisions and are sequentially formed from the inside thereof in a concentric shape.

As shown in FIG. 3, the stator 13 includes a stator body 13A, first transmitting and receiving coils 31a and 32a for the first track Tr1, and second transmitting and receiving coils 31b and 32b for the second track Tr2. The induction detecting type rotary encoder 11 performs a measurement by using the first and second tracks Tr1 and Tr2 through a time division. For example, in the case where the first transmitting coil 31a is driven so as to read out a signal from the first receiving coil 32a (in the case of using the first track Tr1), the induction detecting type rotary encoder 11 allows the second transmitting and receiving coils 31b and 32b to be in a non-driving state (the second track Tr2 is set to be in a non-driving state). In the case where the second transmitting coil 31b is driven so as to read out a signal from the second receiving coil 32b (in the case of driving the second track Tr2), the induction detecting type rotary encoder 11 allows the first transmitting and receiving coils 31a and 32a to be in a non-driving state (the first track Tr1 is set to be in a non-driving state).

The stator body 13A includes a perforation hole 13B which is formed at the center thereof so as to allow the spindle 7 to pass therethrough. The stator body 13A includes a substrate and plural interlayer insulation layers laminated on the substrate. The plural interlayer insulation layers are laminated so as to bury the first transmitting coil 31a, the second transmitting coil 31b, the first receiving coil 32a, and the second receiving coil 32b.

The first transmitting coil 31a and the second transmitting coil 31b are formed in a circular shape and are sequentially formed from the inside so as to be concentric about the spindle 7. The first transmitting coil 31a is located so as to be interposed between the first transmitting coil 32a and the second transmitting coil 32b. The second transmitting coil 31b is located so as to be more distant from the spindle 7 than the second receiving coil 32b. The first transmitting coil 31a is used to apply a magnetic field, generated when a transmitting current having a periodically changing current direction flows therefrom, to a first magnetic flux coupling coil 41a (described later in detail) formed in the rotor 15. The second transmitting coil 31b is used to apply a magnetic field, generated when a transmitting current having a periodically changing current direction flows therefrom, to a second magnetic flux coupling coil 41b (described later in detail) formed in the rotor 15.

The first transmitting coil 31a includes drawn wires 311a which are drawn out from both ends thereof so as to pass over the second transmitting coil 31b and to extend to the outer periphery of the stator body 13A. The second transmitting coil 31b includes drawn wires 324a which are drawn out from both ends thereof so as to extend to the outer periphery of the stator body 13A.

The first receiving coil 32a and the second receiving coil 32b are sequentially formed from the inside so as to be concentric about the spindle 7. The first receiving coil 32a is used to detect an inductive voltage generated by magnetic flux coupling based on an inductive current generated in the first magnetic flux coupling coil 41a by magnetic coupling between the first transmitting coil 31a and the first magnetic flux coupling coil 41a. The second receiving coil 32b is used to detect an inductive voltage generated by magnetic flux coupling based on an inductive current generated in the second magnetic flux coupling coil 41b by magnetic coupling between the second transmitting coil 31b and the second magnetic flux coupling coil 41b.

The first receiving coil 32a includes three receiving coils 321a to 323a having different phases in the rotation direction. Each of the receiving coils 321a to 323a includes an electric wire disposed in a loop shape (diamond shape or sine curved shape). The receiving coils 321a to 323a are disposed while being insulated and separated from each other in such a manner that the intersection portions thereof are arranged above and below the substrate so as not to be short-circuit and are connected to each other through a via hole. In addition, the first receiving coil 32a includes drawn wires 324a to 326a which are drawn out from both ends of the receiving coils 321a to 323a so as to pass over the second receiving coil 32b and to extend to the outer periphery of the stator body 13A.

The second receiving coil 32b is formed in the same manner as that of the first receiving coil 32a, and includes receiving coils 321b to 323b. In addition, the second receiving coil 32b includes drawn wires 324b to 326b which extend from both ends of the receiving coils 321b to 323b to the outer periphery of the stator 13A.

Meanwhile, as shown in FIG. 4, the rotor 15 includes a rotor body 15A, the first magnetic flux coupling coil (first magnetic flux coupling body) 41a for the first track Tr1 and the second magnetic flux coupling coil (second magnetic flux coupling body) 41b for the second track Tr2, which are described above.

The rotor body 15A includes a perforation hole 15B which is formed at the center thereof so as to allow the spindle 7 to pass therethrough. The rotor body 15A includes a substrate and plural interlayer insulation layers laminated on the substrate. The interlayer insulation layers are laminated so as to bury the first magnetic flux coupling coil 41a and the second magnetic flux coupling coil 41b.

The first magnetic flux coupling coil 41a generates an inductive current based on a magnetic field generated by the transmitting current flowing to the first transmitting coil 31a. The second magnetic flux coupling coil 41b generates an inductive current based on a magnetic field generated by the transmitting current flowing to the second transmitting coil 31b. The first magnetic flux coupling coil 41a and the second magnetic flux coupling coil 41b respectively form the first track and the second track which cause a periodic change for each rotation. The second magnetic flux coupling coil 41b has a shape which suppresses magnetic coupling between itself and the first receiving coil 32a generated by the inductive current generated between itself and the first transmitting coil 31a.

The first magnetic flux coupling coil 41a is formed so as to be concentric about the spindle 7. The first magnetic flux coupling coil 41a is formed in a gear shape. In the first magnetic flux coupling coil 41a, concave portions 411a protruding inward in a direction close to the spindle 7 and convex portions 412a protruding outward in a direction away from the spindle 7 are alternately formed.

The second magnetic flux coupling coil 41b is formed so as to be concentric about the spindle 7. The second magnetic flux coupling coil 41b has a pattern of which the inner periphery is substantially continuous in the circumferential direction. The second magnetic flux coupling coil 41b includes a first wiring 410b and a second wiring 420b. The first wiring 410b is formed in a gear shape. In the first wiring 410b, concave portions 411b protruding inward in a direction close to the spindle 7 and convex portions 412b protruding outward in a direction away from the spindle 7 are alternately formed. The second wiring 420b is formed so as to be connected to the concave portions 411b of the first wiring 410b. In addition, the first wiring 410b and the second wiring 420b may be continuously and integrally formed.

Figure 5:
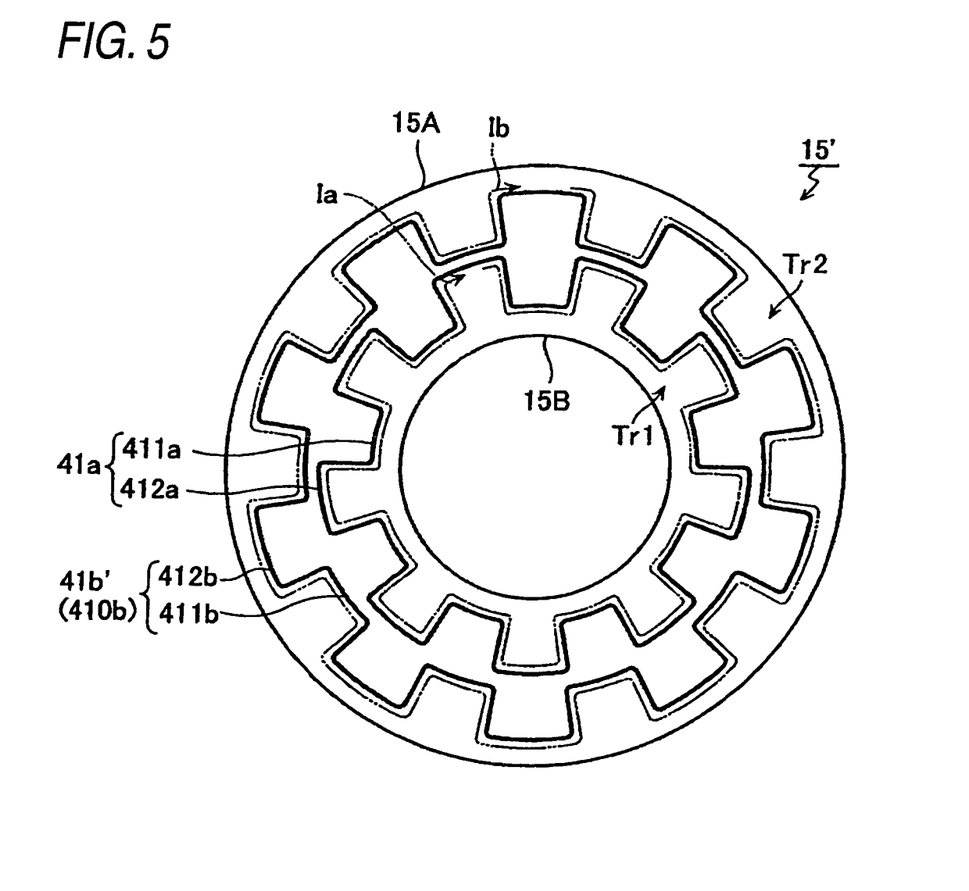
FIG. 5 is a diagram illustrating a configuration on a rotor 15' according to a comparative example.
Figure 6:
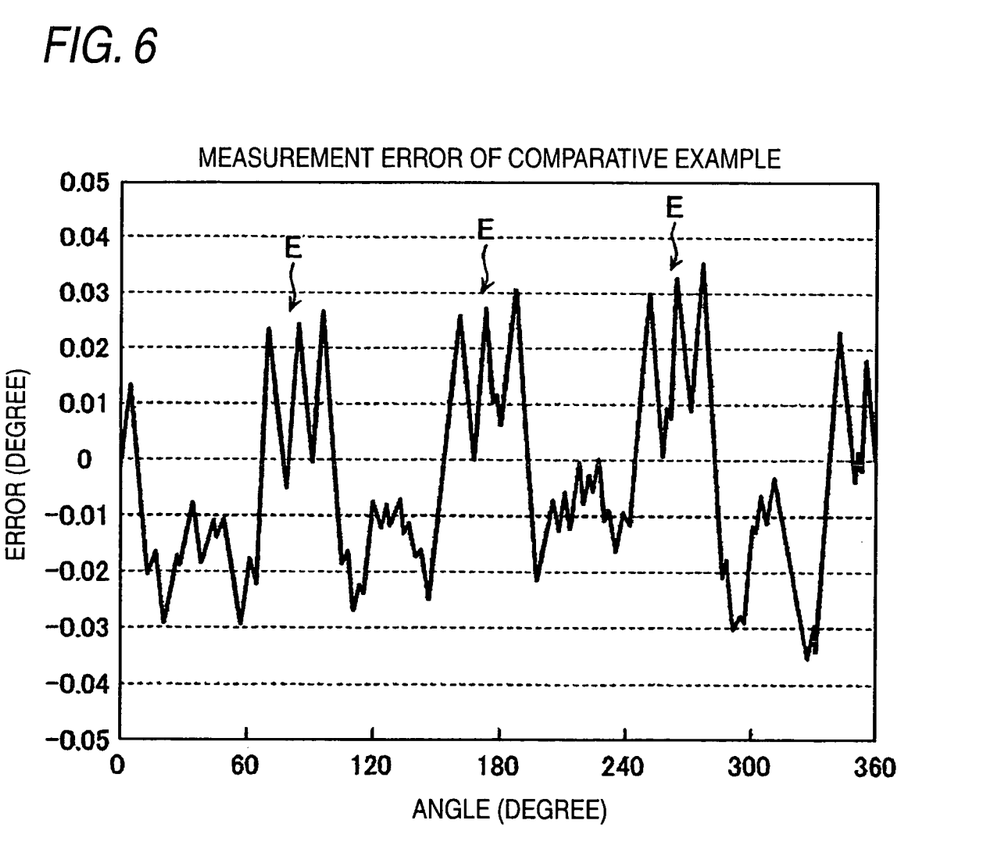
FIG. 6 is a diagram illustrating a measurement error according to the comparative example.
Figure 7:
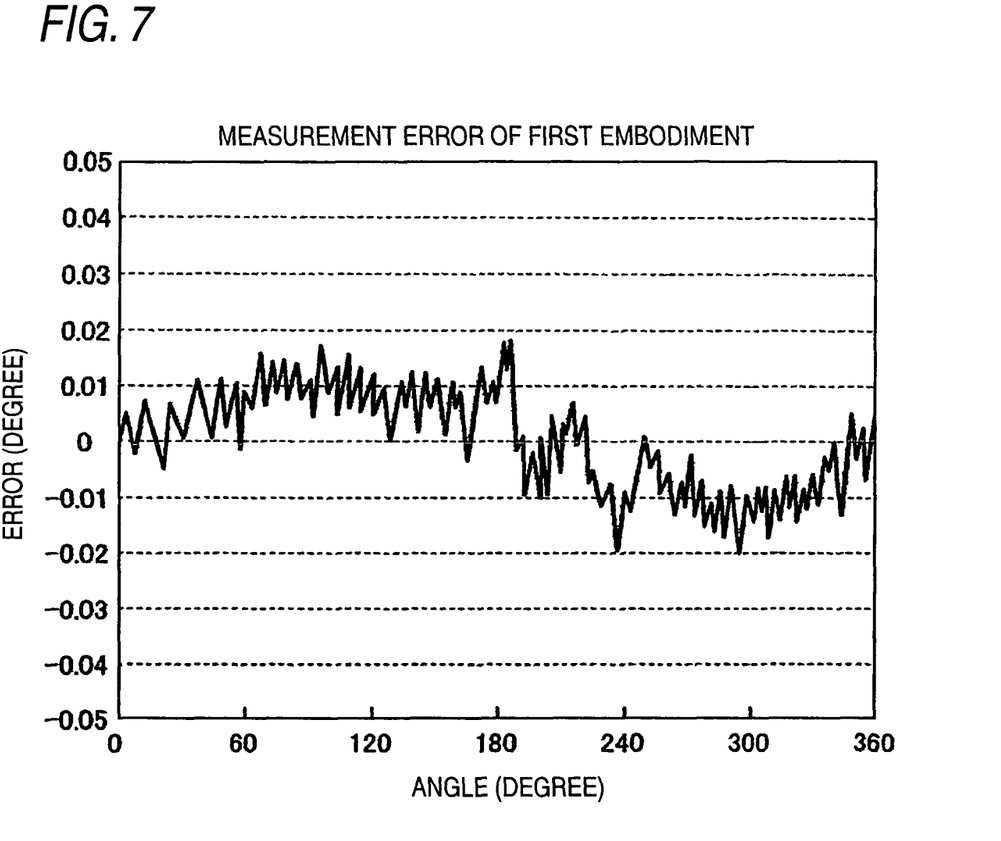
FIG. 7 is a diagram illustrating a measurement error according to a first embodiment.

Next, by referring to FIGS. 5 to 7, an advantage of the induction detecting type rotary encoder 11 according to the first embodiment will be described on the basis of a comparison with a comparative example. FIG. 5 is a diagram illustrating a configuration on a rotor 15' according to the comparative example. FIG. 6 is a diagram illustrating a measurement error according to the comparative example. FIG. 7 is a diagram illustrating a measurement error according to a first embodiment.

As shown in FIG. 5, in the rotor 15' according to the comparative example, the second magnetic flux coupling coil 41b' includes only the first wiring 410b, and the second wiring 420b connected to the inside of the first wiring 410b is not provided.

In the comparative example having the above-described configuration, an example is supposed in which the measurement is performed by using the first track Tr1. In this case, as shown in FIG. 5, a magnetic field generated by the first transmitting coil 31a generates an inductive current Is flowing to the concave portions 411a and the convex portions 412a of the first magnetic flux coupling coil 41a in a gear shape. Then, the inductive current Ia generates an alternate magnetic flux which causes magnetic-flux coupling with the first transmitting coil 31a. When the alternate magnetic flux is read out by the first receiving coil 32a, the induction detecting type rotary encoder 11 outputs a measurement value.

However, in the above-described comparative example, since the first transmitting coil 31a is also close to the second magnetic flux coupling coil 41b', as shown in FIG. 5, the magnetic field generated by the first transmitting coil 31a generates an inductive current Ib flowing to the concave portions 411b and the convex portions 412b of the second magnetic flux coupling coil 41b' in a gear shape together with the inductive current Ia. The inductive current Ib forms a left turn (or a right turn) vortex-shaped current path in the periphery of each concave portion 411b, and forms a right turn (or a left turn) vortex-shaped current path in the periphery of each convex portion 412b. In addition, the inductive current Ib generates an alternate magnetic flux which causes a magnetic flux coupling with the first transmitting coil 31a. The alternate magnetic flux generated by the inductive current Ib influences the measurement of the first track Tr1. For example, there is a problem in that the alternate magnetic flux of the second track Tr2 is detected by the drawn wires 324a, 325a, and 326a of the first receiving coil 32a. Accordingly, in the comparative example, as shown in FIG. 6, in accordance with a reaction cycle between the drawn wires 324a, 325a, and 326a of the first receiving coil 32a and the second magnetic flux coupling coil 41b', a measurement error E occurs in a signal obtained from the first receiving coil 32a.

On the contrary, as shown in FIG. 4, the above-described rotor 15 according to the first embodiment includes the second magnetic flux coupling coil 41b. The second magnetic flux coupling coil 41b includes the first wiring 410b which is formed in a gear shape and the second wiring 420b which is formed so as to connect the concave portions 411b of the first wiring 410b.

In the first embodiment having the above-described configuration, as in the comparative example, an example is supposed in which the measurement is performed by the first track Tr1. In this case, the magnetic field generated by the first transmitting coil 31a generates the inductive currents Ia and Ib as in the comparative example.

Meanwhile, according to the first embodiment having the above-described configuration, as shown in FIG. 4, the magnetic field generated by the first transmitting coil 31a generates an inductive current Ic which flows to the second wiring 420b and the concave portions 411b of the first wiring 410b of the second magnetic flux coupling coil 41b in a circular shape together with the inductive currents Ia and Ib. The inductive current Ic does not generate an alternate current which causes magnetic flux coupling with the first receiving coil 32a. In addition, the inductive current Ic more dominantly flows than the inductive current Ib. In addition, the inductive currents Ib and Ic flows in opposite directions in the periphery of the convex portion 412b (where the vortex-shaped current path is not generated), and the occurrence of the magnetic flux due to the inductive current Ib is suppressed.

By means of the above-described inductive current Ic, in the first embodiment, as shown in FIG. 7, the measurement error E of the comparative example does not occur in the signal obtained from the first receiving coil 32a. That is, the induction detecting type rotary encoder 11 according to the first embodiment of the invention is able to perform a highly precise measurement by suppressing the measurement error E of the comparative example using the second magnetic flux coupling coil 41b.

Meanwhile, when the measurement of the second track Tr2 is performed, since a magnetic flux coupling degree between the second transmitting coil 31b and the first wiring 410b of the second magnetic flux coupling coil 41b becomes larger than a magnetic flux coupling degree between the second transmitting coil 31b and the second wiring 420b, the inductive current Ib flowing to the first wiring 410b flows more dominantly than the inductive current Ic flowing to the second wiring 420b. Accordingly, the second magnetic flux coupling coil 41b generates an alternate magnetic flux. Therefore, it is possible to perform the measurement of the second track Tr2 without any trouble.

Figure 8:
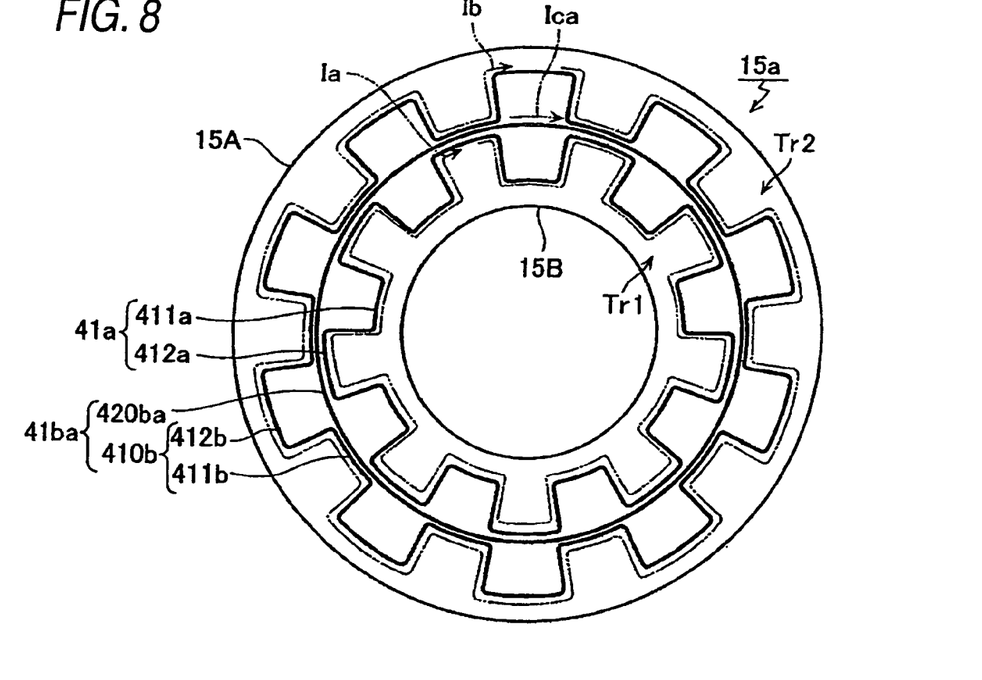
FIG. 8 is a diagram illustrating a configuration on a rotor 15a according to a second embodiment.

Next, by referring to FIG. 8, a configuration of the induction detecting type rotary encoder according to a second embodiment of the invention will be described. FIG. 8 is a diagram illustrating a configuration on a rotor 15a according to the second embodiment. In addition, in the second embodiment, the same reference numerals are given to the same constituents of the first embodiment, and the description thereof is omitted.

As shown in FIG. 8, the induction detecting type rotary encoder according to the second embodiment is different from that of the first embodiment in that a second magnetic flux coupling coil 41ba includes a second wiring 420ba separately formed on the inside of the first wiring 410b. The second wiring 420ba is formed in a circular shape so as to be closer to the spindle 7 than the first wiring 410b.

Next, an advantage of the induction detecting type rotary encoder according to the second embodiment will be described. In the second embodiment having the above-described configuration, an example is supposed in which the measurement is performed by using the first track Tr1 as in the first embodiment. In this case, the magnetic field generated by the first transmitting coil 31a generates the inductive currents Ia and Ib as in the first embodiment. In addition, as shown in FIG. 8, the magnetic field generated by the first transmitting coil 31a generates an inductive current Ica flowing to the second wiring 420ba of the second magnetic flux coupling coil 41ba together with the inductive currents Ia and Ib. By means of the inductive current Ica, the induction detecting type rotary encoder according to the second embodiment is able to perform a highly precise measurement by suppressing the above-described measurement error E as in the first embodiment.

Figure 9:
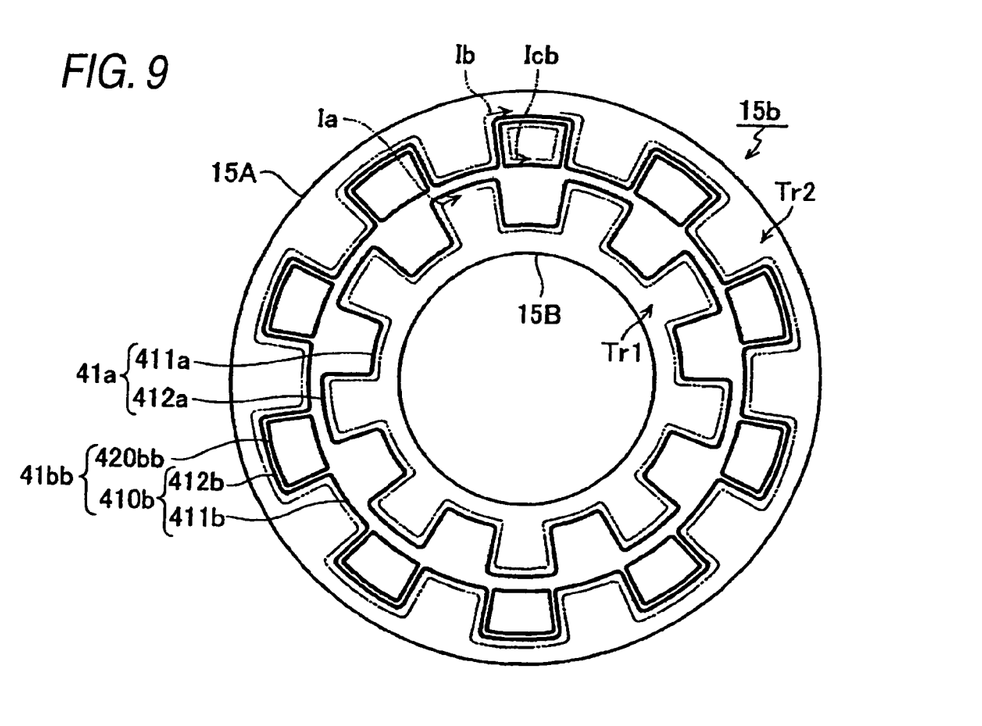
FIG. 9 is a diagram illustrating a configuration on a rotor 15b according to a third embodiment.

Next, by referring to FIG. 9, a configuration of the induction detecting type rotary encoder according to a third embodiment of the invention will be described. FIG. 9 is a diagram illustrating a configuration on a rotor 15b according to the third embodiment. In addition, in the third embodiment, the same reference numerals are given to the same constituents of the first and second embodiments, and the description thereof is omitted.

As shown in FIG. 9, the induction detecting type rotary encoder according to the third embodiment is different from those of the first and second embodiments in that a second magnetic flux coupling coil 41bb includes a second wiring 420bb having a roughly quadrangular isolation pattern fitted to the convex portion 412b of the first wiring 410b.

An advantage of the induction detecting type rotary encoder according to the third embodiment will be described. In the third embodiment having the above-described configuration, an example is supposed in which the measurement is performed by using the first track Tr1 as in the first embodiment. In this case, the magnetic field generated by the first transmitting coil 31a generates the inductive currents Ia and Ib as in the first embodiment. In addition, as shown in FIG. 9, the magnetic field generated by the first transmitting coil 31a generates an inductive current Icb flowing to the second wiring 420bb of the second magnetic flux coupling coil 41bb together with the inductive currents Ia and Ib. Since the alternate magnetic flux due to the inductive current Ib is negated by the inductive current Icb, the induction detecting type rotary encoder according to the third embodiment is able to perform a highly precise measurement by suppressing the above-described measurement error E as in the first embodiment.

In addition, since the inductive currents Ib and Icb flow in the same direction upon measuring the second track Tr2, the alternate magnetic flux occurs.

Figure 10:
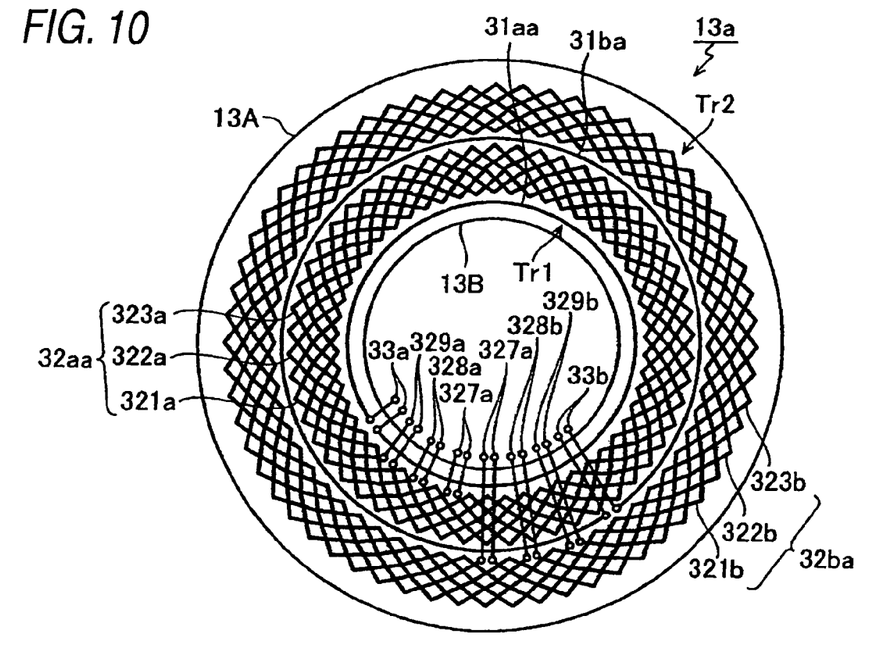
FIG. 10 is a diagram illustrating a configuration on a stator 13a according to a fourth embodiment.
Figure 11:
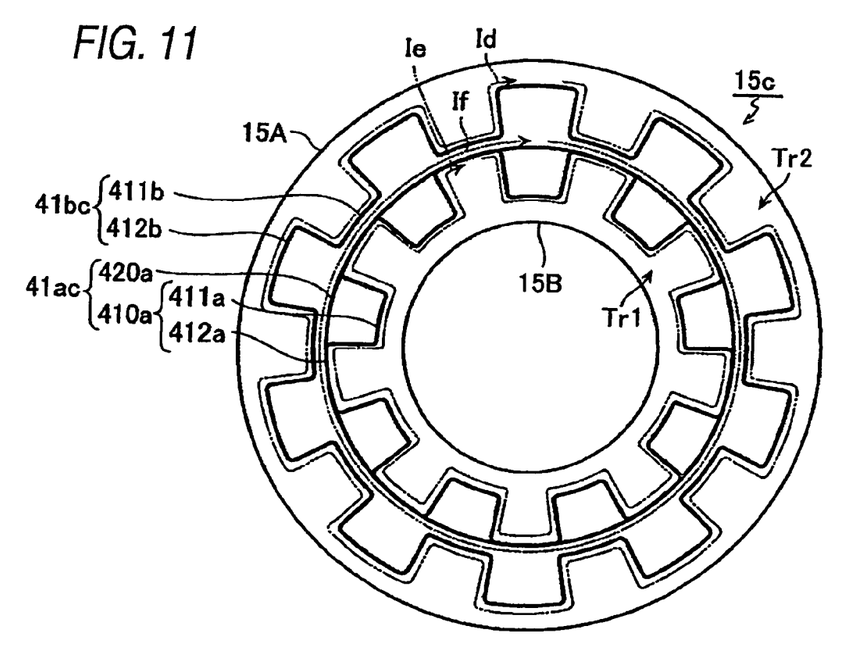
FIG. 11 is a diagram illustrating a configuration on a rotor 15c according to the fourth embodiment.

Next, by referring to FIGS. 10 and 11, a configuration of the induction detecting type rotary encoder according to a fourth embodiment of the invention will be described. FIG. 10 is a diagram illustrating a configuration on a stator 13a according to the fourth embodiment. FIG. 11 is a diagram illustrating a configuration on a rotor 15c according to the fourth embodiment. In addition, in the fourth embodiment, the same reference numerals are given to the same constituents of the first to third embodiments, and the description thereof is omitted.

In the first to third embodiments, examples have been described in which the measurement of the first track Tr1 is prevented from being influenced by the second magnetic flux coupling coil of the second track Tr2, but in fourth to sixth embodiments, examples are described in which the measurement of the second track Tr2 is prevented from being influenced by the first magnetic flux coupling coil of the first track Tr1. In this case, since the transmitting coils are respectively disposed inside the track, there is a problem in that the transmitting coil of the second track Tr2 is coupled to the magnetic flux coupling coil of the first track Tr1.

As shown in FIG. 10, the stator 13a includes a first transmitting coil 31aa and a second transmitting coil 31ba which are sequentially provided from the inside. In addition, as shown in FIG. 10, the stator 13a includes a first receiving coil 32aa and a second receiving coil 32ba which are sequentially provided from the inside.

The first transmitting coil 31aa and the second transmitting coil 31ba are formed in a circular shape, and are sequentially provided from the inside so as to be concentric about the spindle 7. The first transmitting coil 31aa is located so as to be closer to the spindle 7 than the first receiving coil 32aa. The second transmitting coil 31ba is located so as to be interposed between the first receiving coil 32aa and the second receiving coil 32ba. The first transmitting coil 31aa is used to apply a magnetic field, generated when a transmitting current having a periodically changing current direction flows therefrom, to a first magnetic flux coupling coil 41ac (described later in detail) formed in the rotor 15c. The second transmitting coil 31ba is used to apply a magnetic field, generated when a transmitting current having a periodically changing current direction flows therefrom, to a second magnetic flux coupling coil 41bc (described later in detail) formed in the rotor 15c.

The first transmitting coil 31aa includes a drawn wire 33a which extend from both ends thereof to the perforation hole 13B of the stator 13a. The second transmitting coil 31ba includes a drawn wire 33b which extends from both ends thereof to the perforation hole 13B of the stator 13a.

As in the first to third embodiments, the first receiving coil 32aa includes the receiving coils 321a to 323a. Meanwhile, differently from the first to third embodiments, the first receiving coil 32aa includes drawn wires 327a to 329a which extend from both ends of the receiving coils 321a to 323a to the perforation hole 13B of the stator 13a.

As in the first to third embodiments, the second receiving coil 32ba includes the receiving coils 321b to 323b. Meanwhile, differently from the first to third embodiments, the second receiving coil 32ba includes drawn wires 327b to 329b which extend from both ends of the receiving coils 321b to 323b to the perforation hole 138 of the stator 13a.

As shown in FIG. 11, the rotor 15c includes the first magnetic flux coupling coil (first magnetic flux coupling body) 41ac and the second magnetic flux coupling coil (second magnetic flux coupling body) 41bc which are sequentially provided from the inside. This point of the fourth embodiment is different from the first to third embodiments.

The first magnetic flux coupling coil 41ac generates an inductive current based on a magnetic field generated by the transmitting current flowing to the first transmitting coil 31aa. The second magnetic flux coupling coil 41bc generates an inductive current based on a magnetic field generated by the transmitting current flowing to the second transmitting coil 31ba. The first magnetic flux coupling coil 41ac and the second magnetic flux coupling coil 41bc respectively form the first track and the second track which cause a periodic change for each rotation. The first magnetic flux coupling coil 41ac has a shape which suppresses magnetic coupling between itself and the second receiving coil 32ba generated by the inductive current generated between itself and the second transmitting coil 31ba.

The first magnetic flux coupling coil 41ac is formed so as to be concentric about the spindle 7. The first magnetic flux coupling coil 41ac has a pattern of which the outer periphery is substantially continuous in the circumferential direction. The first magnetic flux coupling coil 41ac includes the first wiring 410a and the second wiring 420a. The first wiring 410a is formed in a gear shape. In the first wiring 410a, concave portions 411a protruding inward in a direction close to the spindle 7 and convex portions 412a protruding outward in direction away from the spindle 7 are alternately formed. The second wiring 420a is formed so as to connect the convex portions 412a of the first wiring 410a. In addition, the first wiring 410a and the second wiring 420a may be continuously and integrally formed.

The second magnetic flux coupling coil 41bc is formed so as to be concentric about the spindle 7. The second magnetic flux coupling coil 41bc is formed in a gear shape. In the second magnetic flux coupling coil 41bc, concave portions 411b protruding inward in a direction close to the spindle 7 and convex portions 412b protruding outward in a direction away from the spindle 7 are alternately formed.

Next, an advantage of the induction detecting type rotary encoder according to the fourth embodiment will be described. As shown in FIG. 11, the first magnetic flux coupling coil 41ac includes the first wiring 410a which is formed in a gear shape and the second wiring 420a which is formed so as to connect the concave portions 411b of the first wiring 410b.

In the fourth embodiment having the above-described configuration, an example is supposed in which the measurement is performed by using the second track Tr2. In this case, as shown in FIG. 11, a magnetic field generated by the second transmitting coil 31ba generates an inductive current Id flowing to the concave portions 411b and the convex portions 412b of the second magnetic flux coupling coil 41bc in a gear shape. Then, the inductive current Id generates an alternate magnetic flux which causes magnetic-flux coupling with the second receiving coil 32ba. When the alternate magnetic flux is read out, the induction detecting type rotary encoder outputs a measurement value.

In addition, as shown in FIG. 11, the magnetic field generated by the second transmitting coil 31ba generates an inductive current Ie which flows to the convex portions 412a and the concave portions 411a of the first wiring 410a of the first magnetic flux coupling coil 41ac in a gear shape together with the inductive current Id. The induction current Ie causes the measurement error.

Further, as shown in FIG. 11, the magnetic field generated by the second transmitting coil 31ba generates an inductive current If which flows to the second wiring 420a and the convex portions 412a of the first wiring 410a of the first magnetic flux coupling coil 41ac in a circular shape together with the inductive currents Id and Ie. The inductive current If does not generate an alternate magnetic flux which causes magnetic flux coupling with the second receiving coil 32ba. In addition, the inductive current If more dominantly flows than the inductive current Ie. Then, the inductive currents Ie and If flow in opposite directions in the periphery of the concave portion 411a (where the vortex-shaped current path is not generated), and the occurrence of the magnetic flux due to the inductive current Ie is suppressed.

By means of the above-described inductive current If, in the fourth embodiment, the signal obtained from the second receiving coil 32ba is not influenced by the first magnetic flux coupling coil 41ac. That is, the induction detecting type rotary encoder according to the fourth embodiment of the invention is able to perform a highly precise measurement by suppressing the measurement error using the first magnetic flux coupling coil 41ac.

Meanwhile, when the measurement of the first track Tr1 is performed, since a magnetic flux coupling degree between the first transmitting coil 31aa and the first wiring 410a of the first magnetic flux coupling coil 41ac becomes larger than a magnetic flux coupling degree between the first transmitting coil 31b and the second wiring 420a, the inductive current Ie flowing to the first wiring 410a flows more dominantly than the inductive current If flowing to the second wiring 420a. Accordingly, the first magnetic flux coupling coil 41ac generates an alternate magnetic flux. Therefore, it is possible to perform the measurement of the first track Tr1 without any trouble.

Figure 12:
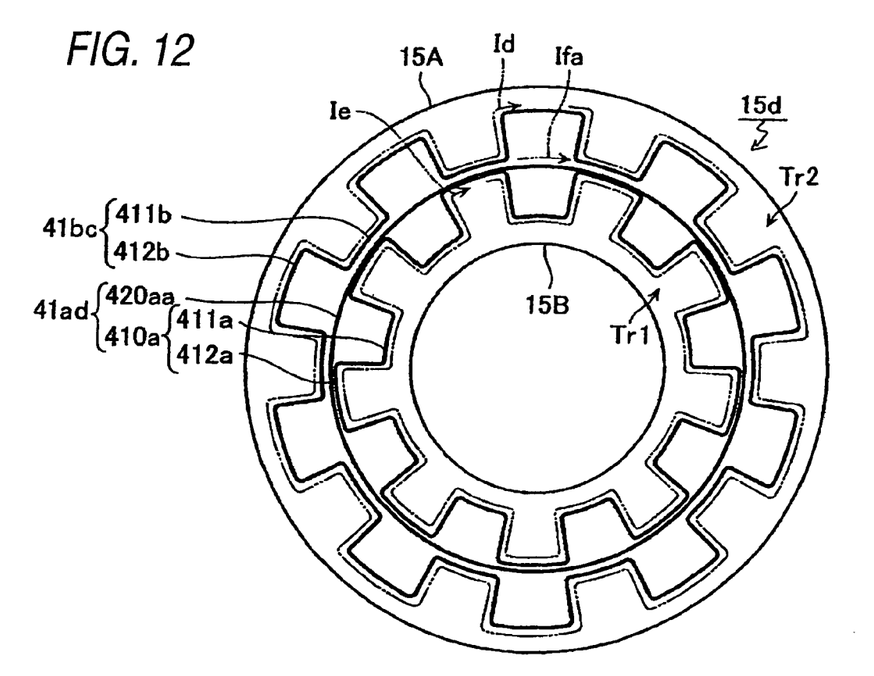
FIG. 12 is a diagram illustrating a configuration on a rotor 15d according to a fifth embodiment.

Next, by referring to FIG. 12, a configuration of the induction detecting type rotary encoder according to a fifth embodiment of the invention will be described. FIG. 12 is a diagram illustrating a configuration on a rotor 15d according to the fifth embodiment. In addition, in the fifth embodiment, the same reference numerals are given to the same constituents of the first to fourth embodiments, and the description thereof is omitted.

As shown in FIG. 12, the induction detecting type rotary encoder according to fifth embodiment is different from that of the fourth embodiment in that a first magnetic flux coupling coil 41ad includes a second wiring 420aa separately formed on the outside of the first wiring 410a. The second wiring 420aa is formed in a circular shape so as to be closer to the spindle 7 than the first wiring 410a.

Next, an advantage of the induction detecting type rotary encoder according to the fifth embodiment will be described. In the fifth embodiment having the above-described configuration, an example is supposed in which the measurement is performed by using the second track Tr2 as in the fourth embodiment. In this case, the magnetic field generated by the second transmitting coil 31ba generates the inductive currents Id and Ie as in the fourth embodiment. In addition, as shown in FIG. 12, the magnetic field generated by the second transmitting coil 31ba generates an inductive current Ifa which flows to the second wiring 420aa of the first magnetic flux coupling coil 41ad in a circular shape together with the inductive currents Id and Ie. By means of the inductive current Ifa, the induction detecting type rotary encoder according to the fifth embodiment is able to perform a highly precise measurement by suppressing the measurement error as in the fourth embodiment.

Figure 13:
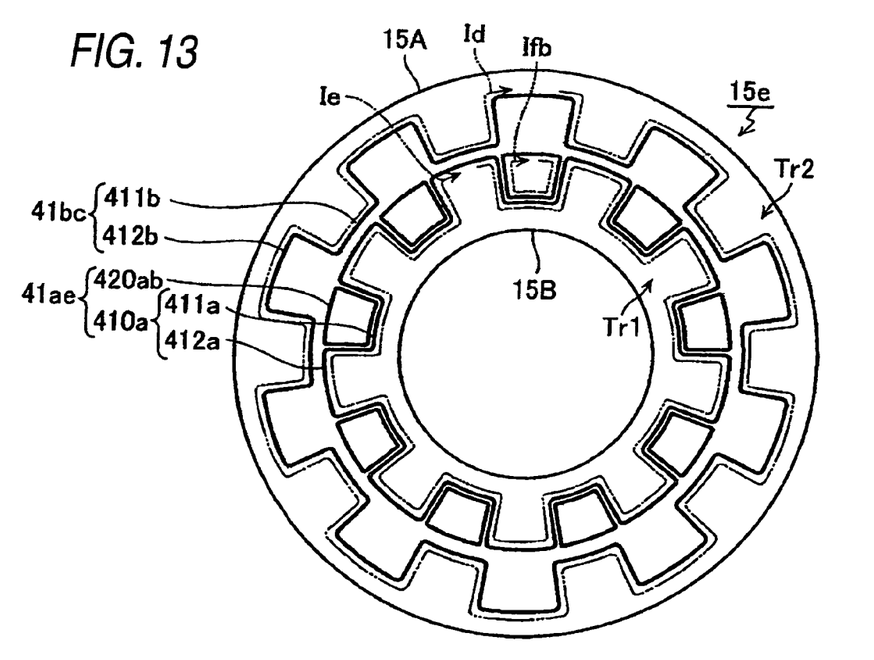
FIG. 13 is a diagram illustrating a configuration on a rotor 15e according to a sixth embodiment.

Next, by referring to FIG. 13, a configuration of the induction detecting type rotary encoder according to a sixth embodiment of the invention will be described. FIG. 13 is a diagram illustrating a configuration on the rotor 15b according to the sixth embodiment. In addition, in the sixth embodiment, the same reference numerals are given to the same constituents of the first to fifth embodiments, and the description thereof is omitted.

As shown in FIG. 13, the induction detecting type rotary encoder according to the sixth embodiment is different from those of the fourth and fifth embodiments in that a second magnetic flux coupling coil 41ae includes a second wiring 420ab having a roughly quadrangular isolation pattern which is fitted to the concave portion 411a of the first wiring 410a.

An advantage of the induction detecting type rotary encoder according to the sixth embodiment will be described. In the sixth embodiment having the above-described configuration, as in the fourth embodiment, an example is supposed in which the measurement is performed by using the second track Tr2. In this case, the magnetic field generated by the second transmitting coil 31ba generates the inductive currents Id and Ie as in the fourth embodiment. In addition, as shown in FIG. 13, the magnetic field generated by the second transmitting coil 31ba generates an inductive current Ifb which flows to the second wiring 420ab of the first magnetic flux coupling coil 41ae together with the inductive currents Id and Ie. Since the alternate magnetic flux due to the inductive current Ie is negated by the inductive current Ifb, the induction detecting type rotary encoder according to the sixth embodiment is able to perform a highly precise measurement by suppressing the measurement error as in the fourth embodiment.

In addition, since the inductive currents Ie and Ifb flow in the same direction upon measuring the second track Tr2, the alternate magnetic flux occurs.

As described above, although the embodiments of the invention have been described, the invention is not limited thereto, but various modifications, additions, etc. can be made within the scope not departing from the spirit of the invention. For example, the first magnetic flux coupling body and the second magnetic flux coupling body may be electrodes, or holes or concave portions formed in a conduction plate instead of the first and second magnetic flux coupling coils as in the above-described embodiments.

What is claimed is:

1. An induction detecting type rotary encoder comprising:
a stator;
a rotor configured to be rotated with respect to a rotary shaft, the rotor being disposed while facing the stator;
a first transmitting coil disposed on a first surface of the stator, the first surface facing the rotor;
a second transmitting coil disposed on the first surface to surround the first transmitting coil, the second transmitting coil being arranged in a concentric pattern with the first transmitting coil with respect to the rotary shaft;
a first receiving coil disposed on the first surface;
a second receiving coil disposed on the first surface to surround the first receiving coil, the second receiving coil being arranged in a concentric pattern with the first receiving coil with respect to the rotary shaft;
a first magnetic flux coupling body disposed on a second surface of the rotor, the second surface facing the stator, the first magnetic flux coupling body magnetically coupling with the first receiving coil; and
a second magnetic flux coupling body disposed on the second surface to surround the first magnetic flux coupling body, the second magnetic flux coupling body being arranged in a concentric pattern with the first magnetic flux coupling body with respect to the rotary shaft, the second magnetic flux coupling body magnetically coupling with the second receiving coil, wherein:
the first transmitting coil is disposed between the first receiving coil and the second receiving coil;
a distance between the second transmitting coil and the rotary shaft is larger than a distance between the second receiving coil and the rotary shaft;
the first magnetic flux coupling body forms a first track for causing a periodic change for each rotation;
the second magnetic flux coupling body forms a second track for causing a periodic change for each rotation;
the second magnetic flux coupling body has a pattern of which an inner peripheral side is substantially continuous in a circumferential direction,
the second magnetic flux coupling body includes a first wiring and a second wiring, and
a magnetic flux coupling degree between the second transmitting coil and the first wiring of the second magnetic flux coupling body becomes larger than a magnetic flux coupling degree between the second transmitting coil and the second wiring of the second magnetic flux coupling body.

2. The induction detecting type rotary encoder according to claim 1, wherein
the second magnetic flux coupling body includes:
the first wiring including a first gear-shaped wiring in which concave portions and convex portions are alternately formed in a circumferential direction; and
the second wiring which connects an inner peripheral side of the first wiring.

3. The induction detecting type rotary encoder according to claim 1, wherein
the second magnetic flux coupling body includes:

the first wiring including a first gear-shaped wiring in which concave portions and convex portions are alternately formed in a circumferential direction; and the second wiring including a second circular wiring which is located on an inner peripheral side of the first wiring.

4. The induction detecting type rotary encoder according to claim 1, wherein the second magnetic flux coupling body includes:

the first wiring including a first gear-shaped wiring in which concave portions and convex portions are alternately formed in a circumferential direction; and the second wiring including a second close-loop-shaped wiring which is disposed to be fitted to the concave portions.

5. An induction detecting type rotary encoder comprising:

a stator;

a rotor configured to be rotated with respect to a rotary shaft, the rotor being disposed while facing the stator;

a first transmitting coil disposed on a first surface of the stator, the first surface facing the rotor;

a second transmitting coil disposed on the first surface to surround the first transmitting coil, the second transmitting coil being arranged in a concentric pattern with the first transmitting coil with respect to the rotary shaft;

a first receiving coil disposed on the first surface;

a second receiving coil disposed on the first surface to surround the first receiving coil, the second receiving coil being arranged in a concentric pattern with the first receiving coil with respect to the rotary shaft;

a first magnetic flux coupling body disposed on a second surface of the rotor, the second surface facing the stator, the first magnetic flux coupling body magnetically coupling with the first receiving coil; and a second magnetic flux coupling body disposed on the second surface to surround the first magnetic flux coupling body, the second magnetic flux coupling body being arranged in a concentric pattern with the first magnetic flux coupling body with respect to the rotary shaft, the second magnetic flux coupling body magnetically coupling with the second receiving coil, wherein:

a distance between the first receiving coil and the rotary shaft is larger than a distance between the first transmitting coil and the rotary shaft;

the second transmitting coil is disposed between the first receiving coil and the second receiving coil;

the first magnetic flux coupling body forms a first track for causing a periodic change for each rotation;

the second magnetic flux coupling body forms a second track for causing a periodic change for each rotation;

the first magnetic flux coupling body has a pattern of which an outer peripheral side is substantially continuous in a circumferential direction, the second magnetic flux coupling body includes a first wiring and a second wiring, and a magnetic flux coupling degree between the second transmitting coil and the first wiring of the second magnetic flux coupling body becomes larger than a magnetic flux coupling degree between the second transmitting coil and the second wiring of the second magnetic flux coupling body.

6. The induction detecting type rotary encoder according to claim 5, wherein the first magnetic flux coupling body includes:

a first gear-shaped wiring in which concave portions and convex portions are alternately formed in a circumferential direction; and a second wiring which connects an outer peripheral side of the first gear-shaped wiring.

7. The induction detecting type rotary encoder according to claim 5, wherein the first magnetic flux coupling body includes:

a first gear-shaped wiring in which concave portions and convex portions are alternately formed in a circumferential direction; and a second circular wiring which is located on an outer peripheral side of the first gear-shaped wiring.

8. The induction detecting type rotary encoder according to claim 5, wherein the second magnetic flux coupling body includes:

the first wiring including a first gear-shaped wiring in which concave portions and convex portions are alternately formed in a circumferential direction; and the second wiring including a second close-loop-shaped wiring which is disposed to be fitted to the concave portions.

* * * * *